No. 730,165. PATENTED JUNE 2, 1903.
J. H. SAVILL.
BIB COCK.
APPLICATION FILED JUNE 19, 1901.
NO MODEL.

Witnesses
F. E. Bechtold
Herman E. Metius

Inventor
Joseph H. Savill
by his Attorneys

No. 730,165. Patented June 2, 1903.

UNITED STATES PATENT OFFICE.

JOSEPH H. SAVILL, OF CAMDEN, NEW JERSEY, ASSIGNOR TO HENRY H. FLECK, OF PHILADELPHIA, PENNSYLVANIA.

BIB-COCK.

SPECIFICATION forming part of Letters Patent No. 730,165, dated June 2, 1903.

Application filed June 19, 1901. Serial No. 65,156. (No model.)

*To all whom it may concern:*

Be it known that I, JOSEPH H. SAVILL, a citizen of the United States, residing in Camden, New Jersey, have invented certain Improvements in Bib-Cocks, of which the following is a specification.

The object of my invention is to so construct a bib-cock as to provide for ready adjustment of the movable element of the same to compensate for wear of the washer, to permit ready removal of said movable element for the purpose of renewing the washer without the necessity of turning off the water from the cock, and to limit the extent of opening movement without employing any special stop for the purpose. This object I attain in the manner hereinafter set forth, reference being had to the accompanying drawings, in which—

Figure 1:
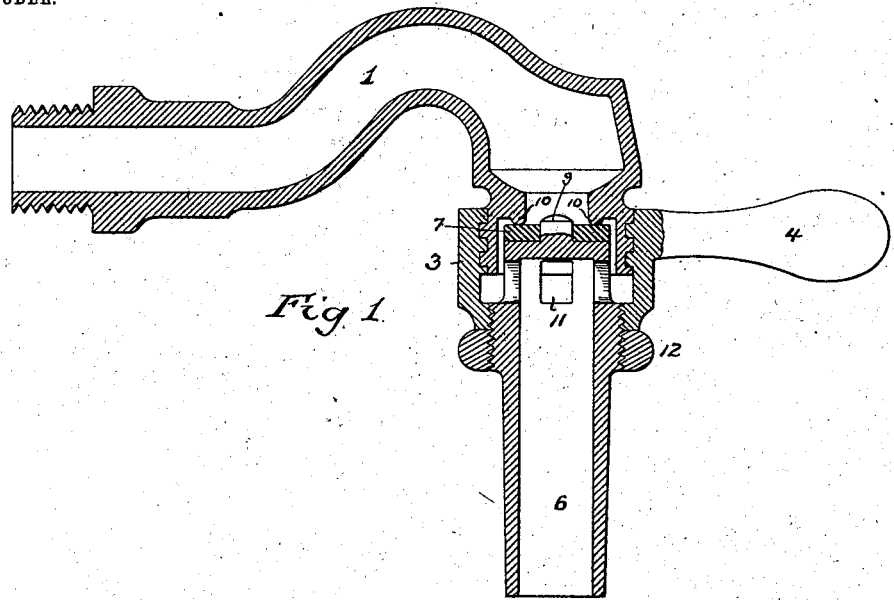
Figure 2:
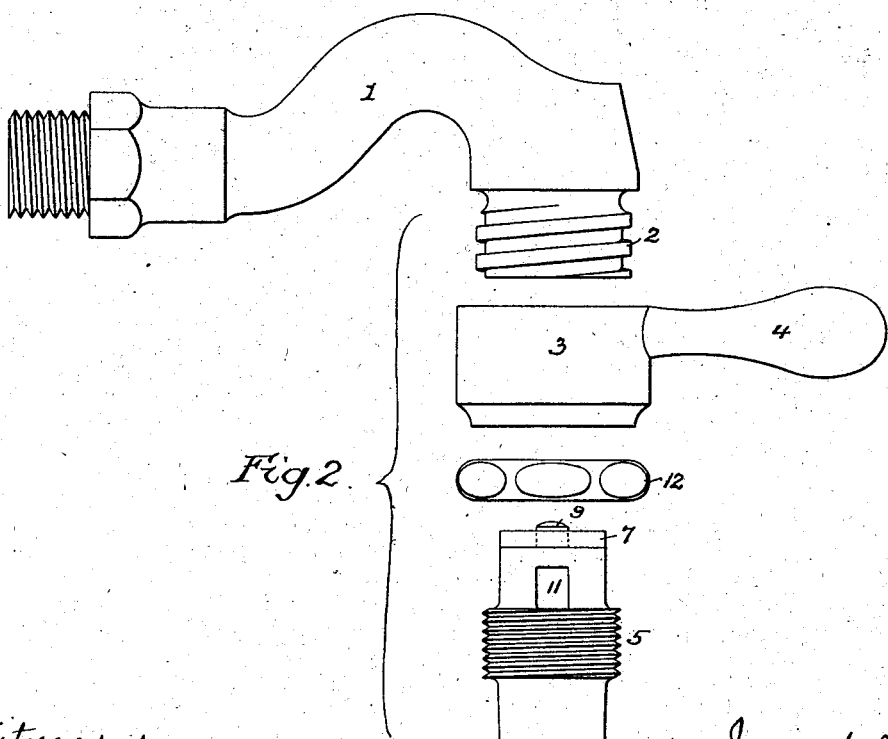

Figure 1 represents a sectional view of a bib-cock constructed in accordance with my invention, and Fig. 2 is a view of the parts of the cock detached from each other.

The body of the cock is represented at 1, said body having formed upon its outer depending end a screw-thread 2, preferably of coarse pitch, for the reception of the nut 3, which serves as a means of opening and closing the cock and is provided with a projecting operating-handle 4. Screwed into the lower portion of this nut is a threaded portion 5 of the delivery-nozzle 6 of the cock, said nozzle having mounted upon its inner end a washer 7, which is properly held in place by a suitable central pin or block 9 of the nozzle and is adapted to bear against an internal seat 10, formed some distance above the lower end of the tubular body of the cock, so that the portion of said tubular body which depends below the seat 10 acts to direct downward the escaping volume of fluid when the cock is open. The nozzle 6 has suitable discharge-ports 11, through which the fluid flows in order to gain access to the bore of the nozzle, and to the threaded portion 5 of said nozzle which extends outwardly beyond the threaded opening formed in the nut 3 for its reception is adapted a lock-nut 12, which by contact with the lower end of the nut 3 serves to govern the position of the washer 7 of the nozzle in respect to said lower end of the nut.

The cock is opened and closed by turning the nut 3 in one direction or the other upon the threaded lower end of the body of the cock, movement in one direction lowering the nozzle and opening the cock and movement in the opposite direction raising the nozzle and closing the cock.

When the washer 7 becomes worn and it is desired to readjust the same, it is only necessary to back off slightly the lock-nut 12 and then screw the nozzle 6 a little farther into the nut 3, so as to cause the washer to bear firmly against the seat 10 when the said nut 3 is in position for closing the cock, the lock-nut being then again tightened, so as to preserve the parts in this new relation. When it becomes necessary to renew the washer, the lock-nut 12 may be first backed off slightly and the nozzle 6 then completely unscrewed from the nut 3, so as to permit of the removal of the worn-out washer and the application of a new one, after which the nozzle can be again screwed into the nut 3 and secured in position thereon by tightening the lock-nut 12, and this operation can be performed without the necessity of turning off the water, as the continued flow of the water through the cock does not interfere either with the removal or replacing of the nozzle and the flow is directed into the sink or other receptacle as well when the nozzle is removed as when it is in place.

In applying the nut 3 to the screw-thread 2 the handle 4 is bent or sprung downward until it can pass the body of the cock and is then bent back again to its original position, so that it will by contact with said body of the cock prevent the unscrewing and removal of the nut, no special stop for this purpose being therefore required. The amount of movement of the handle permitted before the washer 7 comes into contact with the seat 10 will depend upon the relative positions of the nut 3 and nozzle 6, and this can be regulated as desired by screwing the nozzle into the nut to a greater or less extent.

Having thus described my invention, I claim and desire to secure by Letters Patent—

The combination of the body of the cock having a screw-thread and valve-seat thereon, the operating-nut adapted to said thread on the body of the cock, and the nozzle screwed into said nut and having a washer for bearing upon the valve-seat, and a lock-nut applied to the threaded portion of the nozzle and bearing upon the operating-nut for locking said nozzle in position in respect thereto, substantially as specified.

In testimony whereof I have signed my name to this specification in the presence of two subscribing witnesses.

JOSEPH H. SAVILL.

Witnesses:
FRANK E. BECHTOLD,
JOS. H. KLEIN.